United States Patent
Dischler

(10) Patent No.: US 6,428,443 B1
(45) Date of Patent: Aug. 6, 2002

(54) SPLIT TORQUE EPICYCLIC GEARING

(75) Inventor: Louis Dischler, Spartanburg, SC (US)

(73) Assignee: Delphi Oracle Corp., Spartanburg, SC (US)

( * ) Notice: Subject to any disclaimer, the term of this patent is extended or adjusted under 35 U.S.C. 154(b) by 20 days.

(21) Appl. No.: 09/772,055

(22) Filed: Jan. 29, 2001

(51) Int. Cl.[7] ............................................. F16H 57/08
(52) U.S. Cl. ........................................... 475/343; 475/5
(58) Field of Search ................................. 475/343, 331, 475/332, 1, 5; 74/661, 664, 665 A, 665 B, 665 C, 665 GB, 665 H

(56) References Cited

U.S. PATENT DOCUMENTS

| | | |
|---|---|---|
| 4,660,437 A * | 4/1987 | Scott ........................... 416/152 |
| 4,674,351 A | 6/1987 | Byrd |
| 4,831,897 A | 5/1989 | Dobbs |
| 5,117,704 A | 6/1992 | Kish et al. |
| 5,135,442 A | 8/1992 | Bossler, Jr. |
| 5,802,918 A | 9/1998 | Chen et al. |
| 5,823,470 A * | 10/1998 | Craig et al. ................... 244/60 |

* cited by examiner

*Primary Examiner*—Pam Rodriguez

(57) ABSTRACT

The main rotor of a helicopter is driven by an epicyclic gearbox comprising a rotor sun gear coaxial and co-rotational with the rotor, a stationary sun gear coaxial with the rotor sun gear, at least one planet having an axis parallel to and rotating about the sun gear axis, and making contact with both sun gears. The planet comprises first and second planetary coaxial gears mechanically constrained to rotate together. The first planetary gear is in meshing engagement with the stationary sun gear and the second planetary gear is in meshing engagement with the rotor sun gear. The first planetary gear is also in meshing engagement with the internal teeth of a first ring gear and the second planetary gear is also in meshing engagement with the internal teeth of a second ring gear. The first and second ring gears are separately driven, and torque is combined by the planets.

18 Claims, 5 Drawing Sheets

SPLIT TORQUE EPICYCLIC GEARING

FIELD OF THE INVENTION

This invention relates generally to a epicyclic gear arrangement for transmitting and combining torque from a plurality of sources or parallel power paths, and more particularly to a helicopter gearbox having redundant gearing.

BACKGROUND OF THE INVENTION

In helicopters, power is commonly supplied by a pair of turbine engines running at 20,000 rpm or more. This power must be combined and delivered to a rotor at a speed that is reduced from the turbine speed by a factor of 50 to 150. It is desirable to split the drive train so that power is delivered within the transmission elements by two or more routes. In this way gear tooth loading is reduced, and operating safety is improved by the redundant gearing should one gear set fail during flight. Split torque gearing is known; for example, such arrangement of gears is disclosed in U.S. Pats. Nos. 5,135,442 and 5,802,918, the teachings of which are entirely incorporated herein by reference.

SUMMARY OF THE INVENTION

In the present invention, the main rotor of a helicopter is driven by an epicyclic gearbox comprising a rotor sun gear coaxial and co-rotational with the rotor, a stationary sun gear coaxial with the rotor sun gear, at least one planet having an axis parallel to and rotating about the sun gear axis, and making contact with both sun gears. The planet comprises first and second planetary coaxial gears mechanically constrained to rotate together. The first planetary gear is in meshing engagement with the stationary sun gear and the second planetary gear is in meshing engagement with the rotor sun gear. The first planetary gear is also in meshing engagement with the internal teeth of a first ring gear and the second planetary gear is also in meshing engagement with the internal teeth of a second ring gear. The first and second ring gears each have a second set of gear teeth (bull teeth) on the top, bottom or sides thereof for meshing engagement with one or more drive pinions. These bull teeth and may be external, face, or even internal. In a first embodiment, a first drive pinion drives the first ring gear and a second drive pinion drives the second ring gear in the same direction. Power derives from individual shaft connection with a pair of engines. In a second embodiment of the invention, input shaft power is further split prior to delivery to the epicyclic gearbox by a plurality of drive pinions.

The first planetary gear has a first planetary pitch diameter, and the second planetary gear has a second planetary pitch diameter, wherein the first planetary pitch diameter is different from the second planetary pitch diameter.

The present invention provides a plurality of power paths into the epicyclic gearing thereby reducing tooth loading and increasing the operational safety factor of the aircraft by adding drive redundancy.

It is therefore an object of the present invention to provide a epicyclic gearbox having parallel power input paths combined by at least one planetary gear.

It is another object of at least one embodiment of the invention to provide a gearbox having a plurality of power paths for driving the main rotor of a helicopter.

BRIEF DESCRIPTION OF THE DRAWINGS

The above as well as other objects of the invention will become more apparent from the following detailed description of the preferred embodiments of the invention, when taken together with the accompanying drawings in which:

FIG. 1A is a perspective cutaway view of an epicyclic rotor drive having two input drive pinion perpendicular to the rotor, according to a preferred embodiment of the invention.

FIG. 1B is the perspective cutaway view of the epicyclic rotor drive shown in FIG. 1A, with alternative drive means replacing the input drive pinions.

DETAILED DESCRIPTION OF THE PRESENTLY PREFERRED EMBODIMENTS

Figure 1:
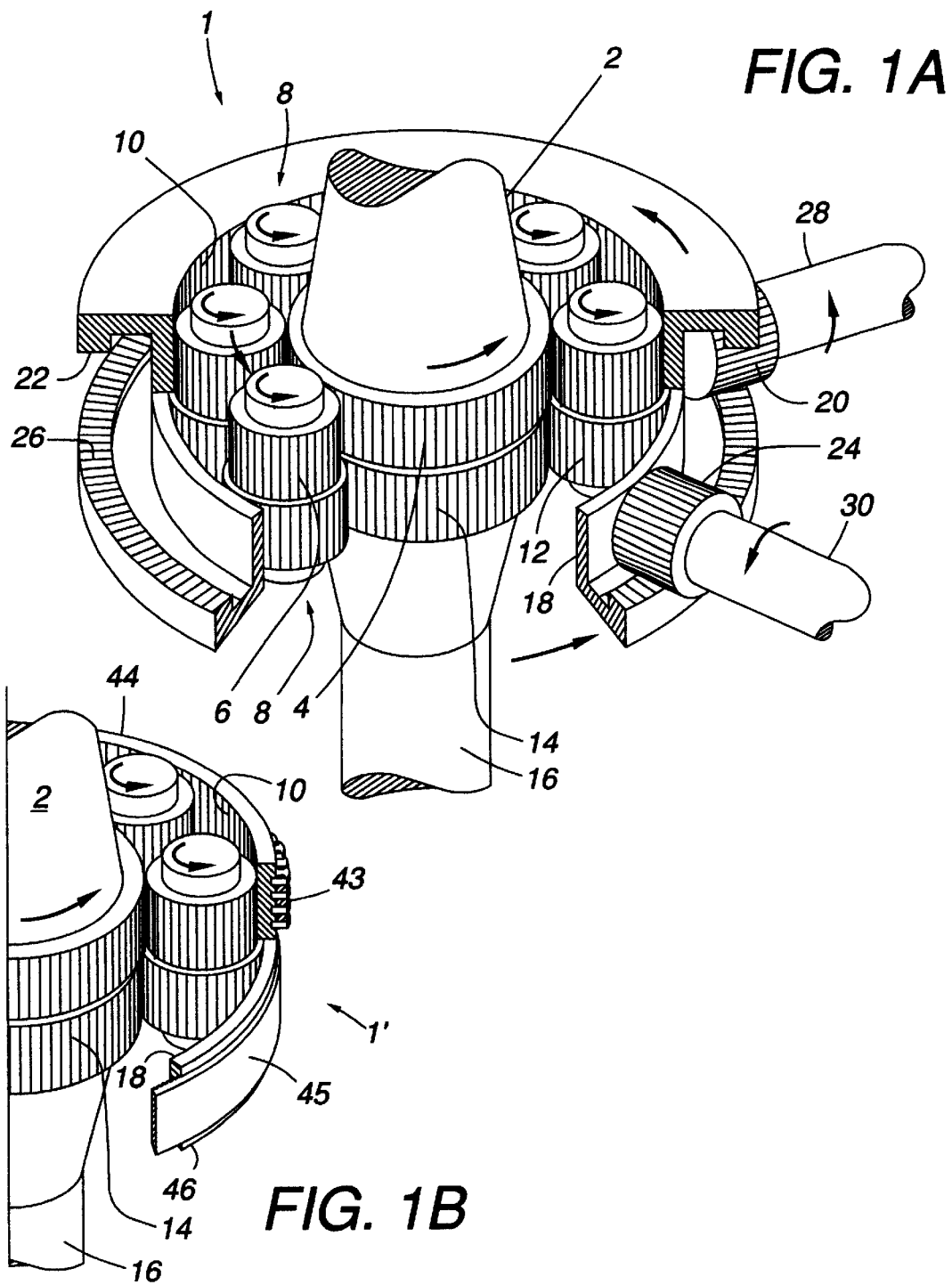
FIG. 1 is a perspective cutaway view of an epicyclic rotor drive having two input drive pinion perpendicular to the rotor, according to a preferred embodiment of the invention.

Referring now to the drawings wherein like numerals refer to like parts, FIG. 1A illustrates an epicyclic gearbox (sans casing) generally indicated by numeral 1. Central rotor 2 rotates in a counter-clockwise direction, and is fixed to rotor sun gear 4, which is in meshing engagement with each of first planetary gears 6 of planets 8. Gears 6 are also in meshing engagement with first ring gear 10. First planetary gears 6 are rotationally fixed to second planetary gears 12, which are in meshing engagement with stationary sun gear 14, fixed to torque shaft 16 which is in turn fixed to a casing or other framework (not shown). Optionally, torque shaft 16 may be held irrotational by a brake, torque arm, compliant member, or by any other suitable means. Second planetary gears 12 are also in meshing engagement with second ring gear 18. First ring gear 10 is driven by first pinion 20 in meshing engagementwith face gear 22. Similarly, second ring gear 18 is driven by second pinion 24 in meshing engagement with face gear 26.

By employing opposing face gears 22, 26 as shown, the centerlines of shafts 28, 30 are positioned nearly in the same plane; however, other surfaces of ring gears 10, 18 may alternatively be used for mounting of the face gears. As shown in FIG. 1B, pulley 46 or sprocket 44 may replace face gears 22, 26 (FIG. 1A) and belt 46 or chain 43 may be used to drive the ring gears 10, 18 of epicyclic gearbox 1. Bevel gears may also be used. In any case, torque supplied by each of shafts 28, 30 (FIG. 1A) are combined by the planets, where the largest numbers of teeth are simultaneously in meshing contact.

First and second ring gears 10, 18 rotate at different speeds. First and second engines (not shown) driving pinions 20, 24 by way of shafts 28, 30 may operate with a speed ratio between them; alternatively, the ratios created by meshing pinion and ring gear pairs, 20, 22 and 24, 26, may be adjusted so as to bring the engine speeds into an equal or substantially equal relationship.

Figure 2:
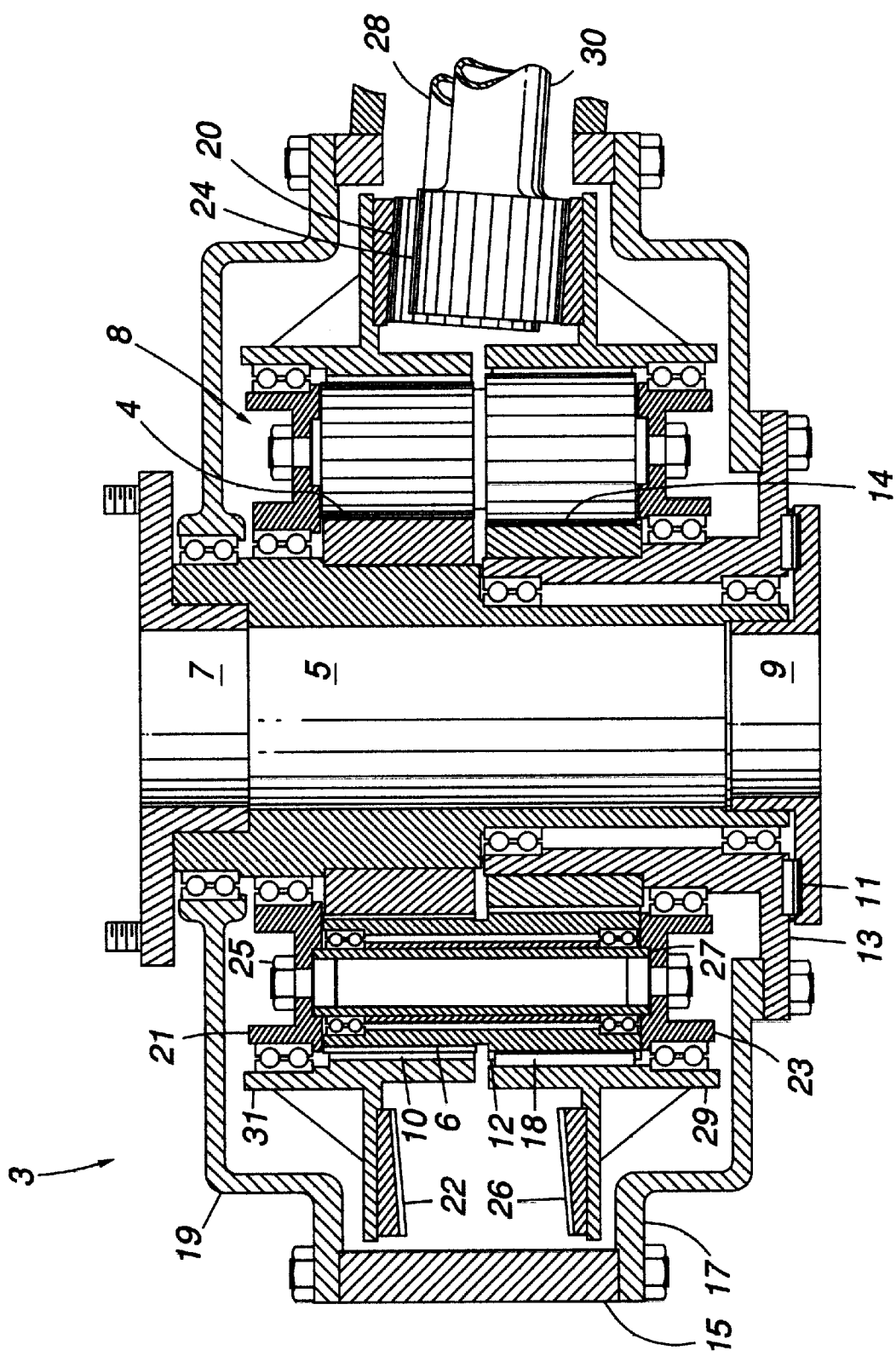
FIG. 2 is a sectional view of an epicyclic rotor drive similar to that shown in FIG. 1

In FIG. 2, power is supplied to face gears 22, 26 by vertically offset driving pinions 20,24, mounted to shafts 28,30. Face gears 22,26 are fixed to carrier rings 31, 29, respectively. Internal ring gear 10 of carrier ring 31 is in meshing engagement with gear 6 of planet 8. Similarly, second ring gear 18 of carrier ring 29 is in meshing engagement with gear 12 of planet 8. Gear 6 and gear 12 are unified so as to rotate together. A plurality of planets 8 are each mounted to planet carrier rings 21, 23 by spacer tubes 27 and bolts 25. Gear 6 is in meshing engagement with rotor sun gear 4, rotationally fixed to rotor shaft 5 and rotor mounting flange 7. Bearing flange 9 is fixed to rotor shaft 5, and vertical loads are accommodated by roller bearings 11. Planet gear 12 is in meshing engagement with sun gear 18, which is fixed to flange member 13, bolted to lower casing element 17. Upper casing element 19 and casing ring 15 are fixed to lower casing element 17 to substantially complete the housing of the rotor drive assembly 3.

Figure 3:
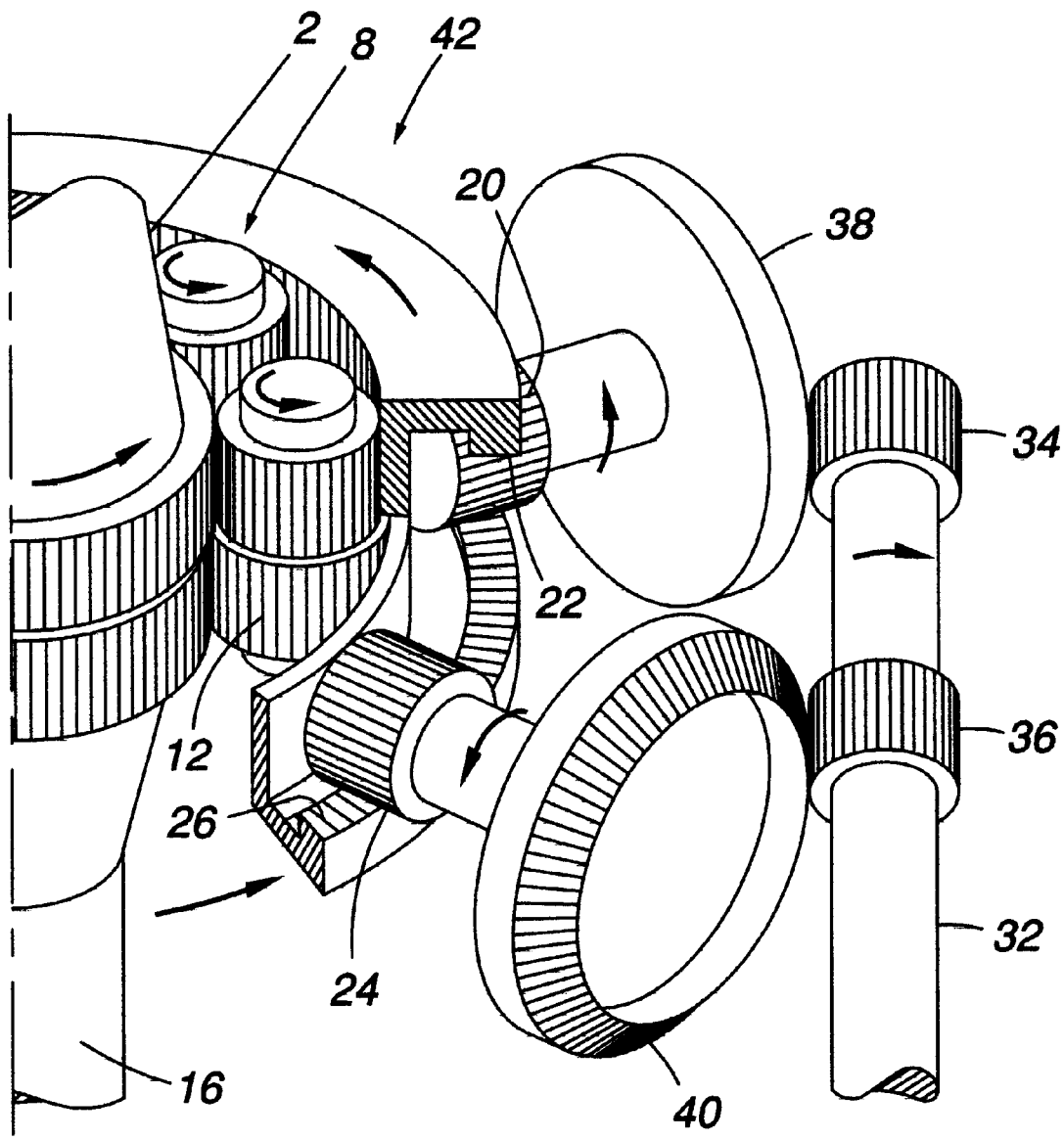
FIG. 3 is a perspective cutaway view of the right side of an epicyclic rotor drive such as that shown in FIG. 1, wherein the two input drive pinions are driven by a single input shaft.

In a second embodiment illustrated in FIG. 3, in which half of a symmetrical gearbox 42 according to another embodiment of the present invention is shown, torque from an individual input shaft 32 may be split prior to delivery to the drive pinions 20, 24. Shaft 32 is shown to have two shaft pinions 34, 36 which are in meshing engagement with face gears 38, 40 respectively. Drive pinion 20 is in meshing engagement with face gear 22, and rotates in the opposite direction to drive pinion 24, which is in meshing engagement with face gear 26. In this embodiment and in other embodiments herein where at least one source of torque is split and re-combined prior to the planets, it is desirable that one or more gears in the split torque path be torsionally compliant. Such compliance is disclosed in U.S. Pats. Nos. 5,117,704, 4,831,897 and 4,674,351, for example, the teachings of which are entirely incorporated herein by reference. Any suitable means of achieving compliance whereby torque is shared substantially equally between parallel paths may be used.

In FIG. 3, a second engine (not shown) may supply gearbox 42 by way of a gear arrangement which is substantially the mirror image of that shown. Other gears may be used such as a take-off gear (not shown) to supply a tail-rotor. One example of such a gear is shown in FIG. 4 below.

Figure 4:
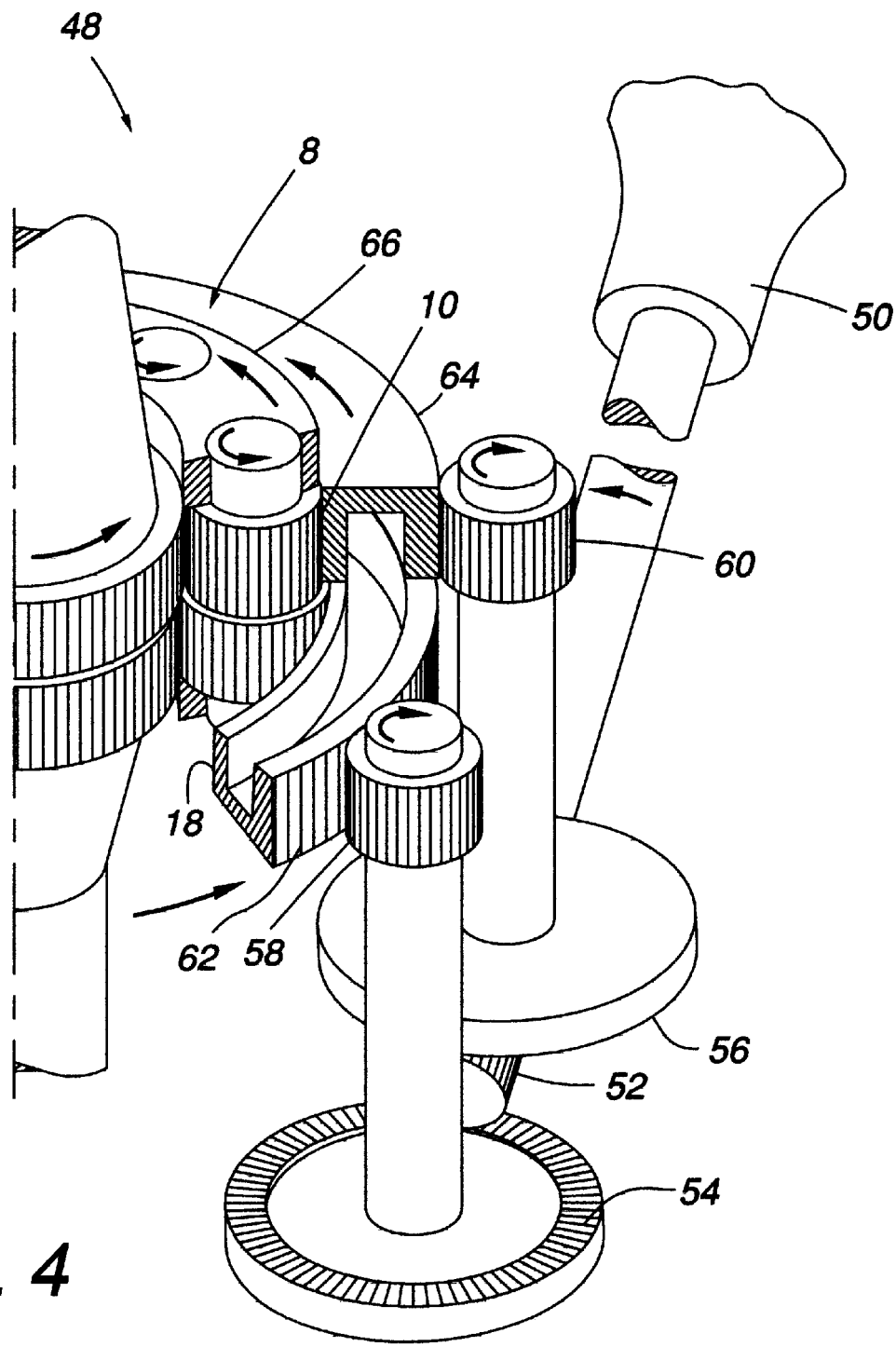
FIG. 4 is a an perspective cutaway view of the night side of an epicyclic rotor drive such as that shown in FIG. 3, wherein the two input drive pinions are parallel to the rotor shaft.

In FIG. 4, an alternative gearing arrangement 48 is shown in which the torque supplied by engine 50 is delivered by pinion 52 to opposing face gears 54, 56, and thence to pinions 58, 60 to the external teeth of ring gears 62,64. Torque is further consolidated by planets 8 rotatably mounted in carrier 66.

Figure 5:
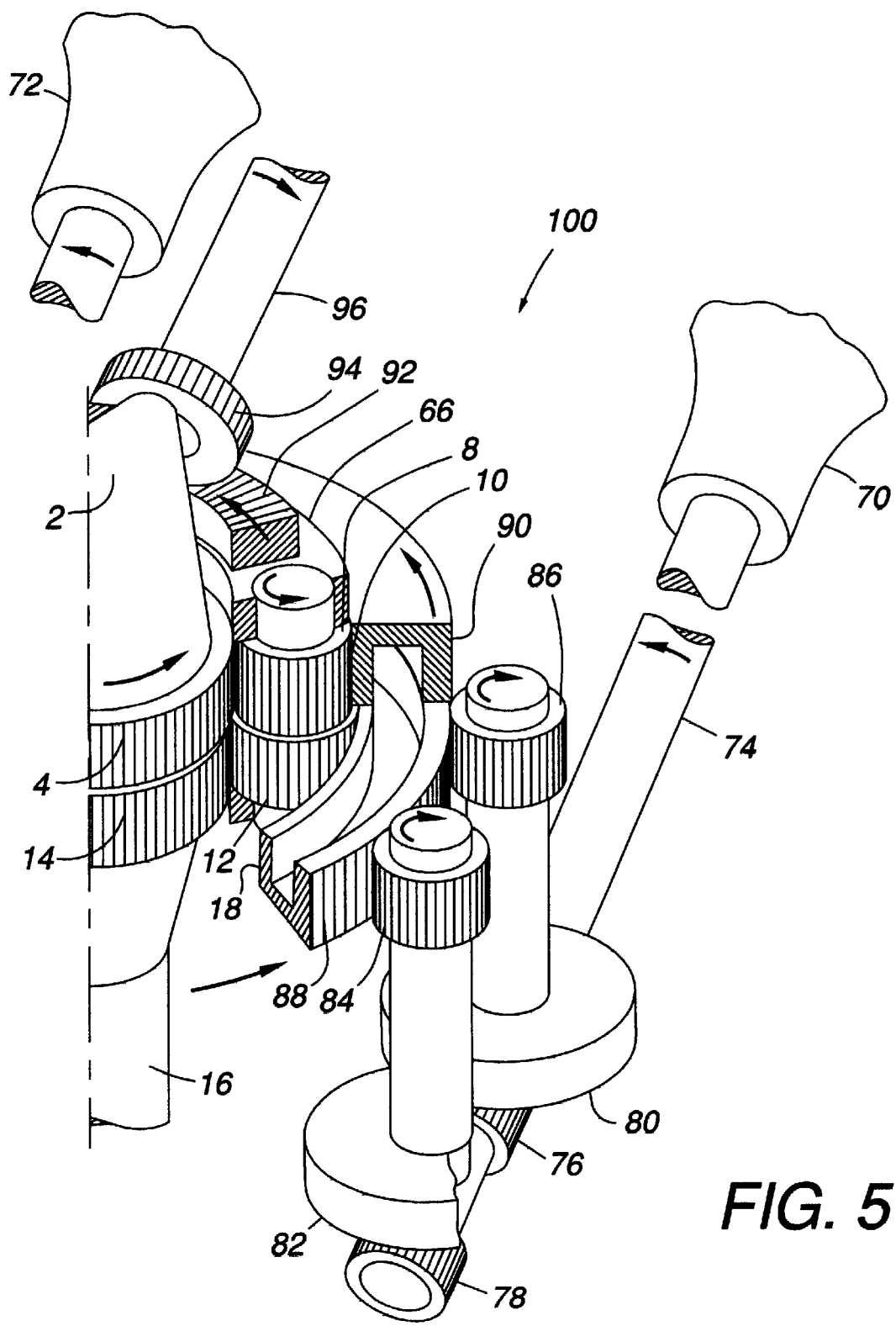
FIG. 5 is an perspective cutaway view of the right side of an epicyclic rotor drive such as that shown in FIG. 4, wherein the two input drive pinions drive the same bull gear, according to a preferred embodiment of the invention.

In FIG. 5, a preferred embodiment of a gear arrangement 100 is shown in which torque supplied by engine 70 is delivered to shaft 74, and thence to a pair of pinions 76,78 driving face gears 80 82, and pinions 86, 84 respectively. The torque from both pinions 86, 84 are consolidated by external ring gear 88, while engine 72 delivers torque to external ring gear 90, by means of a substantially mirror image gear arrangement (except that ring gear 90 is driven rather than ring gear 88). Torque from ring gears 88, 90 is further consolidated by planets 8. Face gear 92 fixed to planet carrier 66 drives take-off pinion 94 driving a tail rotor (not shown) by means of shaft 96. Optionally, pinion 94 may deliver power from a third source (not shown) to be combined by planets 8 with torque supplied by engines 70, 72. The following example is provided to illustrate the various ratios involved. Exemplary values are used for the various gears of the gear arrangement 100 as shown in FIG. 5.

TABLE

| Description | Ref. No. | subscript | N (teeth) |
| --- | --- | --- | --- |
| Rotor sun gear | 4 | rs | 103 |
| Stationary sun gear | 14 | ss | 93 |
| First planet gear | 8 | p1 | 41 |
| Second planet gear | 12 | p2 | 51 |
| First ring gear | 10 | rg1 | 185 |
| Second ring gear | 18 | rg2 | 195 |
| Second face gear | 88 | fg2 | 247 |
| Second drive pinions | 86, 84 | dp2 | 41 |
| Third face gears | 80, 82 | fg3 | 71 |
| Third drive pinions | 76, 78 | dp3 | 23 |

The speed ($\Omega_{pc}$) of the planet carrier 66 is given by the relation $\Omega_{pc} = \Omega_{rs}/(1-\rho)$, where $\rho = (N_{ss}*N_{p1})/(N_{rs}*N_{p2})$. If the speed of the rotor 2 is 200 rpm, $\Omega_{pc} \cong 730$ rpm.

The speed of the second ring gear is given by the relation $\Omega_{rg2} = \Omega_{pc}/(1+N_{ss}/N_{rg2}) \cong 1078$ rpm.

The speed of the second drive pinions 86, 84 are equal to $(\Omega_{rg2}*N_{fg2})/N_{dp2} \cong 6492$ rpm, and the speed of the third drive pinions 76,78 and engine 70 are equal to $(\Omega_{dp2}*N_{fg3})/N_{dp3} \cong 20{,}039$ rpm, representing an overall speed reduction between the engine 70 and the rotor shaft 2 of about one hundred.

Although only a few exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention as defined in the following claims. In the claims, means-plus-function clauses are intended to cover the structures described herein as performing the recited function and not only structural equivalents, but also equivalent structures.

I claim:

1. A gearbox for driving a rotor having a rotor axis, comprising:

(a) a rotor sun gear coaxial and co-rotational with the rotor;

(b) a stationary sun gear coaxial with the rotor sun gear;

(c) at least one planet having an axis parallel to said rotor sun gear axis, said planet comprising a first planetary gear in meshing engagement with said stationary sun gear, and a second planetary gear in meshing engagement with said rotor sun gear, wherein said first planetary gear has a first planetary pitch diameter, said second planetary gear has a second planetary pitch diameter, said first planetary pitch diameter is different from said second planetary pitch diameter, and said first planetary gear is co-rotational with said second planetary gear;

(d) a first ring gear coaxial with the rotor, said first ring gear having internal teeth in meshing engagement with said first planetary gear;

(e) means for rotating said first ring gear at a first rotational speed;

(f) a second ring gear coaxial with the rotor, said second ring gear having internal teeth in meshing engagement with said second planetary gear; and (g) means for rotating said second ring gear at a second rotational speed, said second rotational speed different from said first rotational speed.

2. A gearbox for driving a rotor having a rotor axis, as recited in claim 1, said means for rotating said first ring gear comprising a first face gear co-rotational with said first ring gear, and at least a first pinion in meshing engagement with said first face gear.

3. A gearbox for driving a rotor having a rotor axis, as recited in claim 2, said means for rotating said second ring gear comprising a second face gear co-rotational with said second ring gear, and at least a second pinion in meshing engagement with said second face gear.

4. A gearbox for driving a rotor having a rotor axis, as recited in claim 1, said means for rotating said second ring gear comprising a second face gear co-rotational with said second ring gear, and at least one pinion in meshing engagement with said second face gear.

5. A gearbox for driving a rotor having a rotor axis, as recited in claim 1, further comprising a casing.

6. A gearbox for driving a rotor having a rotor axis, as recited in claim 5, said stationary sun gear head stationary by rigid connection to said casing.

7. A gearbox for driving a rotor having a rotor axis, as recited in claim 5, said stationary sun gear held stationary by a torque arm connection to said casing.

8. A gearbox for driving a rotor having a rotor axis, as recited in claim 1, said stationary sun gear held stationary by compliant means.

9. A gearbox for driving a rotor having a rotor axis, as recited in claim 1, said means for means for rotating said first ring gear comprising a first sprocket co-rotational with said first ring gear, and a first chain or belt in meshing engagement with said first sprocket.

10. A gearbox for driving a rotor having a rotor axis, as recited in claim 9, said means for means for rotating said second ring gear comprising a second sprocket co-rotational with said second ring gear, and a second chain or belt in meshing engagement with said second sprocket.

11. A gearbox for driving a rotor having a rotor axis, as recited in claim 1, wherein the rotor is the main rotor of a helicopter.

12. A gearbox for driving a helicopter rotor having a rotor axis, comprising:
(a) a rotor sun gear coaxial and co-rotational with the rotor;
(b) a stationary sun gear coaxial with the rotor sun gear;
(c) at least one planet having an axis parallel to said rotor sun gear axis, said planet comprising a first planetary gear in meshing engagement with said stationary sun gear, and a second planetary gear co-rotational with said first planetary gear, said second planetary gear in meshing engagement with said rotor sun gear, wherein said first planetary gear has a first planetary pitch diameter, said second planetary gear has a second planetary pitch diameter, and said first planetary pitch diameter is different from said second planetary pitch diameter;
(d) a first drive pinion;
(e) a second drive pinion;
(f) a first ring gear, said first ring gear having internal teeth in meshing engagement with said first planetary gear, and first bull teeth for meshing engagement with said first drive pinion; and
(g) a second ring gear, said second ring gear having internal teeth in meshing engagement with said second planetary gear, and second bull teeth for meshing engagement with said second drive pinion.

13. A gearbox for driving a helicopter rotor having a rotor axis, as recited in claim 12, further comprising:
(h) a third drive pinion in meshing engagement with said first bull teeth; and
(i) a fourth drive pinion in meshing engagement with said second bull teeth.

14. A gearbox for driving a helicopter rotor having a rotor axis, as recited in claim 13, wherein said third drive pinion is commonly driven with said first drive pinion, and said fourth drive pinion is commonly driven with said second drive pinion.

15. A gearbox for driving a helicopter rotor having a rotor axis, as recited in claim 14, said first drive pinion and said third drive pinion are driven by means of a first engine, and said second drive pinion and said fourth drive pinions are driven by means of a second engine.

16. A gearbox for driving a helicopter rotor having a rotor axis, as recited in claim 15, wherein at least one of said pinions or gears comprises torsionally compliant means.

17. A gearbox for driving a helicopter rotor having a rotor axis, as recited in claim 12, wherein said first drive pinion is driven by a first engine, and said second drive pinion is driven by a second engine.

18. A gearbox for driving a helicopter rotor having a rotor axis, as recited in claim 12, wherein at least one of said pinions or gears comprises torsionally compliant means.

\* \* \* \* \*